July 21, 1942.  F. W. BARBKNECHT  2,290,222
METHOD OF MAKING COTTON PICKER SPINDLES
Filed Oct. 30, 1940   2 Sheets-Sheet 1
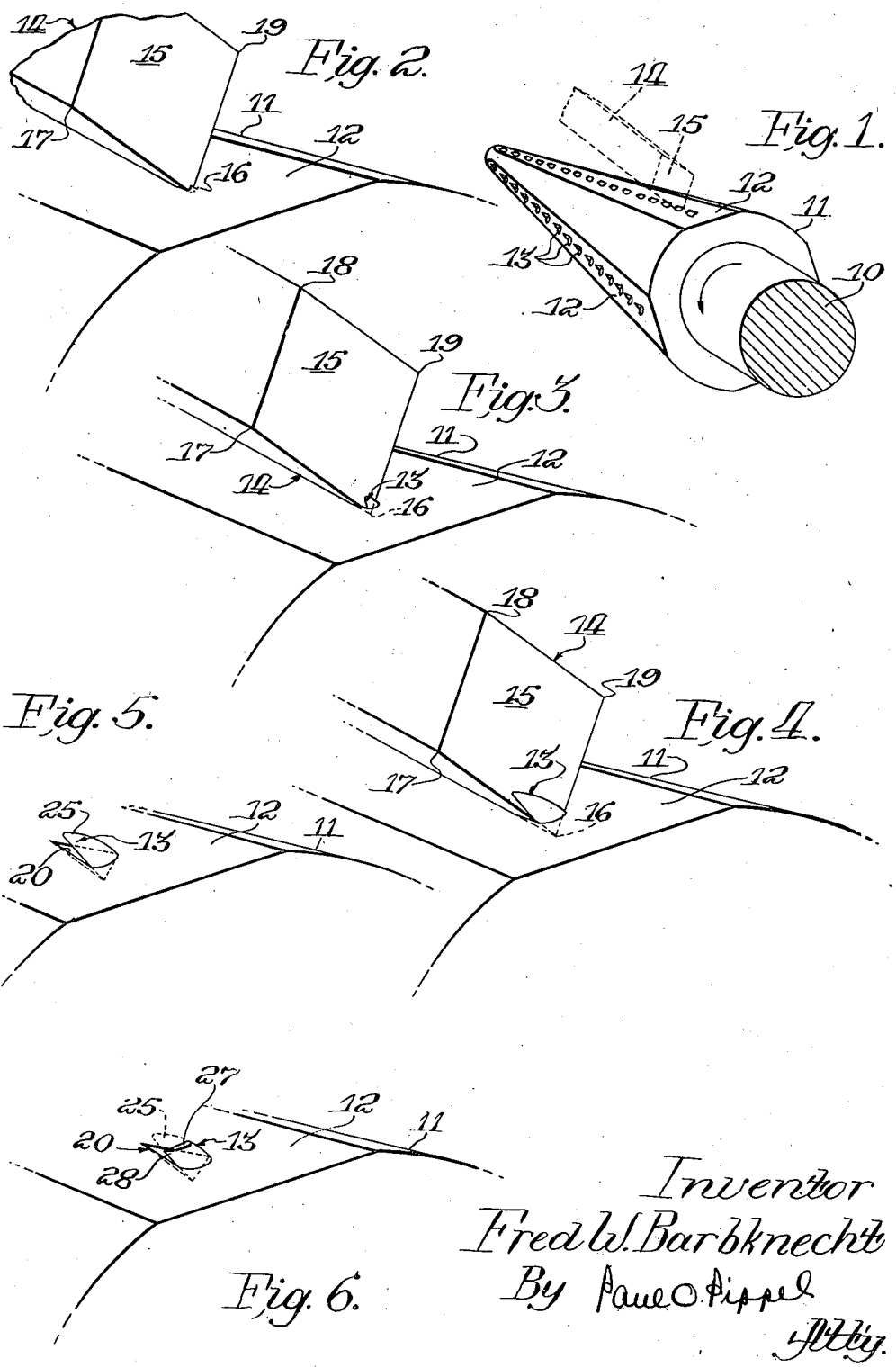
Inventor
Fred W. Barbknecht
By Paul O. Pippel
Atty.

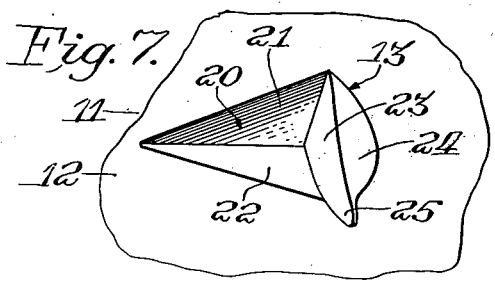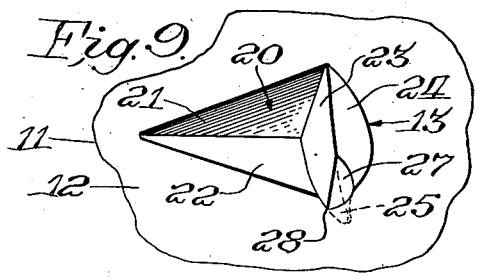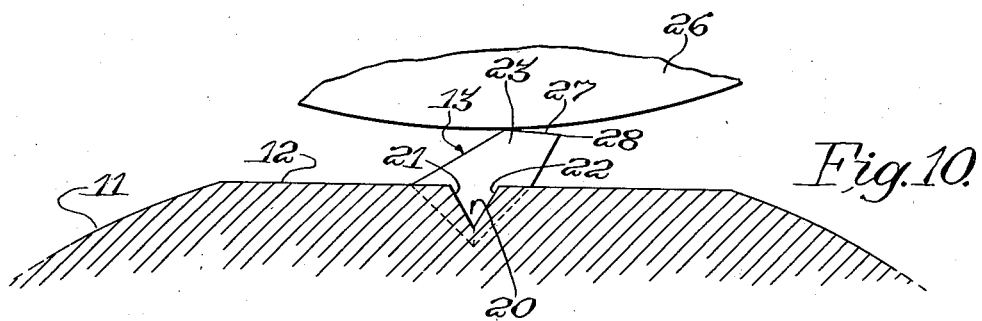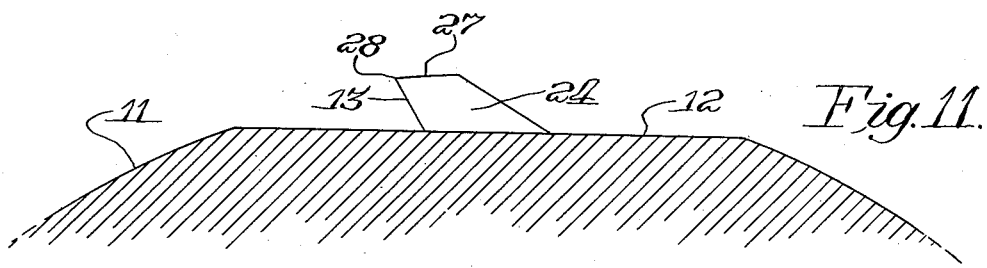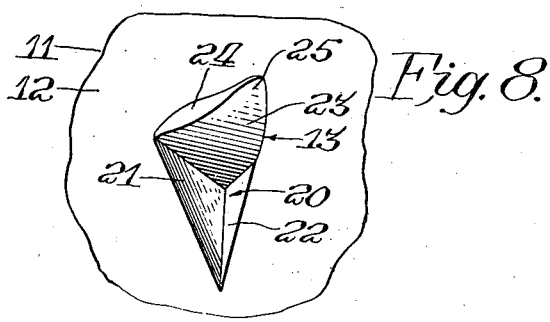

Patented July 21, 1942

2,290,222

UNITED STATES PATENT OFFICE 2,290,222

METHOD OF MAKING COTTON PICKER SPINDLES

Fred W. Barbknecht, Worth, Ill., assignor to International Harvester Company, a corporation of New Jersey Application October 30, 1940, Serial No. 363,531

5 Claims. (Cl. 29—148.3)

This invention relates to an improved cotton picking spindle and to a method of making the same. More specifically it relates to a conical cotton picking spindle having a plurality of barbs thereon, said barbs being formed by a particular method and being of a shape particularly suitable for picking cotton.

A great deal of development work has been done on the design of picking spindles, or fingers, for cotton pickers. Various types of barbs have been provided on spindles of various sizes and shapes. The problem to be solved is to obtain a durable spindle having a long life and which is aggressive to engage cotton linters with sufficient grip to pull the cotton lobes from the boll. It is not, however, permissible to have barbs of such aggressiveness that leaves will be engaged or that the plant stalks and stems will be scraped and damaged. The second major problem is to provide a picking spindle with barbs having the above defined desirable characteristics which can be readily doffed and which will not clog with linters, wrap around the spindle, or gum up with dirt and plant juices during operation.

The principal object of the present invention is to provide a cotton picker spindle having an improved barb or tooth formation which has the desired aggressive features and which can be doffed readily and completely.

Another object is to provide a method of making such barbs, or teeth, on the spindles so that they can be readily manufactured and will have the property of long wear without losing their desirable characteristics.

In the drawings:

Figure 1 is a perspective view of a spindle showing two rows of teeth or barbs thereon, and, in dotted lines, a cutting tool such as utilized in the method of making the teeth;

Figure 2 is an enlarged perspective view showing the cutting tool entering the metal of the spindle;

Figures 3 and 4 show progressive steps of cutting the teeth as the cutting tool advances;

Figure 5 shows the upset portion of metal after removal of the cutting tool;

Figure 6 shows the completed tooth after the projecting end has been ground away to form a needle-like point, the dotted line showing the portion removed by grinding;

Figures 7 and 8 are perspective views of different angles showing the upset portion of metal before grinding to form the tooth;

Figure 9 shows the completed tooth after removal of the end portion to form a needle-like point, the removed portion being shown in dotted lines;

Figure 10 is a cross-section taken looking toward the shank end of the spindle, the grinding wheel being indicated to show the step of removing the end portion of the upset portion of metal to form the teeth; and, Figure 11 is a section similar to Figure 10, looking in a direction toward the small end of the spindle and showing a completed tooth in end elevation.

As shown in the drawings, a spindle made of steel is first formed with a cylindrical shank 10 and a conical, plant-engaging portion 11. A plurality of flat surfaces 12 are milled, or otherwise formed, on a conical portion 11. The teeth, or barbs, 13 are formed at equally spaced locations along the flat portions 12 lengthwise of the spindle. In the method of forming the teeth 13, a cutting tool 14, square in cross-section, is provided at the cutting end with a flat face 15. In upsetting the material for the teeth, the tool is positioned at an angle about 20 degrees with respect to the surface of the flat portions 12 with the cutting end directed toward the larger shank end of the spindle. To explain the angular disposition of the face 15 the corners have been designated with numerals. The engaging corner is designated as 16 and the diagonally opposite corner as 18. The corner in the left in Figures 1 to 4 is designated as 17 and the diagonally opposite corner as 19.

In positioning the tool 14 the top edge leading from the corner 18, the diagonal joining the corners 18 and 16 and the bottom edge of the tool leading from corner 16 lie in a plane which, as illustrated, is vertical and which passes through the center line of the spindle. The flat surface 12 on which the upsets are being made is at right angles to the above mentioned plane.

The face 15 lies in a plane which is angled in both directions with respect to the flat surface 12. The disposition of the face 15 can best be described by defining the relative locations of the diagonals joining the corners. The diagonal between the corners 16 and 18 is at an acute angle with respect to the surface 12. This produces a sharper cutting point at 16 and lifts the upset metal tooth-like prong without excessive curl over or rupture of the metal.

The diagonal joining the corners 17 and 19 is at a substantial angle relative to a plane at right angles to the axis of the spindle with the corner 17 being in a direction away from the shank of the spindle, the corner 19 being advanced in the direction of the shank. This construction of the cutting tool gives the face 15 an angle relative to the lengthwise direction of movement of the tool because of which the prong being formed by the upsetting operation is displaced or bent to one side so that the point overhangs the base.

As the tool 14 is driven toward the face 13 with the cutting corner in engagement therewith, a V-shaped notch 20 is formed in the spindle. The material removed during cutting of the notch follows the angular face 15 of the cutting tool, being turned upwardly and laterally due to the angle of the face.

As the cutting tool progresses lifting the upset prong or barb 13 higher from the face 12, there is a tendency for the upper smaller end of the barb, which was first cut, to curl over somewhat in the same nature as a shaving being removed from wood or metal by a cutting blade. By careful study of the amount of working which the metal will stand, the correct amount of cut has been determined.

As the notch 20 is formed two triangular shaped defined walls 21 and 22 of increasing widths are formed by the cutting tool. The upset prong has a relatively flat wall 23 joining the walls 21 and 22 and a curved wall 24 generally conical in shape.

To complete the tooth the tip end portion 25 is removed by a grinding wheel 26 as shown in Figures 10 and 11. The removal of said end portion forms a small end surface 27 on each tooth. The juncture of the surface 27 and the walls 23 and 24 forms a sharp point 28 which overhangs the base of the tooth. The spindle during cotton picking is rotated in the direction of the arrow shown in Figure 1 with the points 28 overhanging the bases of the teeth in the direction of rotation.

In the method above described, a cotton picker spindle has been provided which is made entirely of steel and which is very durable in operation. The desirable properties have been attained due to the method by which the teeth, or barbs, were formed and due to the particular shape of the barbs as obtained by said method.

It is to be understood that applicant has shown and described only a preferred embodiment of his improved cotton picker spindle construction, and that he claims as his invention all constructions and all methods covered by the appended claims.

What is claimed is:

1. A method of forming teeth on a cotton picker spindle which comprises engaging a metal spindle at spaced locations with a cutting tool for first cutting and then lifting triangular portions in a direction upwardly from the spindle and bending said portions to one side in a direction generally transversely of the aforesaid direction, and subsequently grinding off the top portions of the lifted portions to obtain teeth having sharp points overhanging the bases in one angular direction.

2. A method of forming teeth on a cotton picker spindle which comprises providing flattened portions on a metal spindle, engaging said portions with a cutting tool for first cutting and then lifting triangular portions in a direction upwardly and bending said portions to one side in a direction generally transversely of the aforesaid direction, and subsequently grinding off the top portions of the lifted portions to obtain sharp points overhanging the bases of said portions in one angular direction.

3. A method of forming teeth on a cotton picker spindle which comprises engaging the surface of a conical metal spindle with a cutting tool at spaced locations, cutting and lifting triangular portions of metal upwardly and bending the cut portions in one circumferential direction, and subsequently grinding off the extreme ends of the lifted portions to obtain sharp points overhanging the bases of the cut portions in one angular direction.

4. A method of forming teeth on a cotton picker spindle which comprises forming flattened portions on a conical metal spindle, gouging the surface of said flattened portions at spaced locations and thereby cutting and lifting triangular portions of metal upwardly, bending the cut portions in one circumferential direction whereby the tips of the cut portions overhang the bases adjacent the body of the spindle, and subsequently grinding off the tips of the lifted portions to obtain sharp points overhanging the bases in one angular direction.

5. A method of forming teeth on a cotton picker spindle which comprises providing flattened portion on a conical metal spindle, gouging the surface of said flattened portions at spaced locations and thereby cutting and lifting triangular portions of metal upwardly, bending the cut portions in one circumferential direction whereby the tips of the cut portions overhang the bases adjacent the body of the spindle, and subsequently grinding off the tips of the lifted portions to form end surfaces lying in the cone defining the spindle and thereby obtaining sharp points overhanging the bases in one angular direction.

FRED W. BARBKNECHT.